(12) United States Patent
Iyer

(10) Patent No.: US 8,073,449 B2
(45) Date of Patent: Dec. 6, 2011

(54) WIRELESS MACRO CELL OVERLAY

(75) Inventor: Pradeep J. Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 572 days.

(21) Appl. No.: 12/261,959

(22) Filed: Oct. 30, 2008

(65) Prior Publication Data

US 2010/0113039 A1    May 6, 2010

(51) Int. Cl.
*H04W 40/00* (2009.01)
(52) U.S. Cl. .................... 455/449; 455/444; 455/403
(58) Field of Classification Search .............. 455/444, 455/449
See application file for complete search history.

(56) References Cited

U.S. PATENT DOCUMENTS

2007/0254620 A1* 11/2007 Lindqvist et al. ............. 455/403

* cited by examiner

*Primary Examiner* — Nick Corsaro
*Assistant Examiner* — Gerald Johnson
(74) *Attorney, Agent, or Firm* — Blakely, Sokoloff, Taylor & Zafman LLP

(57) ABSTRACT

Overlaying a Wireless Macro Cell architecture on a Micro Cell network. WLAN MAC Address Translation (WMAT) is used to translate BSSIDs from the BSSID used to initialize a radio in an access node and identify communications between the radio in the access node and a controller, and the BSSID used over the air for Macro Cell operation. WMAT is used for transmit operations, translating the BSSID of outgoing packets to the Macro Cell BSSID prior to wireless transmission. On the receive side, packets undergo WMAT and transmission to the controller if the STN MAC address of the sender is in an ACK table associated with the radio, or the packet is one of a predetermined type. The ACK table is managed by transmit operations, and by control commands from the controller.

9 Claims, 3 Drawing Sheets

WIRELESS MACRO CELL OVERLAY

BACKGROUND OF THE INVENTION

The present invention relates to wireless systems, and in particular, to the problem of overlaying a Macro Cell architecture on top of a Micro Cell network.

Wireless networks, such as those operating according to IEEE 802.11 standards typically provide wireless packet-based data services to clients in a network. In one embodiment of a wireless network such as that shown in FIG. 1, referred to as a Micro Cell architecture, each access node 300 has a distinct Basic Service Set Identifier (BSSID) which usually represents the Media Access Control (MAC) address of the radio in the access node. Access nodes advertise access to one or more networks which are identified by Service Set Identifiers (SSID). Multiple access nodes may advertise the same SSID-identified network on the same or different radio channels, but the BSSIDs are distinct. Access nodes 300 are coordinated by controller 200, which also provides access to network 100.

In a Macro Cell network as shown in FIG. 2, multiple access nodes 300 advertise services using the same BSSID and SSID values, operating on the same channel.

What is needed is a way to overlay a macro cell architecture on a micro cell network.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of overlaying a Macro Cell wireless architecture on a Micro Cell wireless network by providing WLAN Mac Address Translation (WMAT) in the access nodes, allowing an access node to advertise a Macro Cell BSSID over the air, and support connections on that BSSID. In a Micro Cell network comprising one or more access nodes connected to a controller, an access node during initialization establishes one or more connections with its controller. As part of that initialization, the access node establishes connections for each radio in the access node each connection established using the BSSID associated with a radio in the access node.

According to the present invention, as this connection is established with the controller, a Macro Cell Manager running on the controller recognizes BSSIDs associated with Macro Cell nodes. The Macro Cell manager sends control messages to the indicated BSSID, changing the radio associated with that BSSID to Macro Cell mode, and giving it a new BSSID to use for wireless communications. Other information such as channel selection and power levels may also be supplied.

During operation in Macro Cell mode, the radio applies wireless mac address translation (WMAT) to transmit traffic sent to its BSSID by the controller, translating the BSSID used on the controller link to the BSSID supplied for over the air Macro Cell operation. On the receive side, an ACK table is associated with the radio in Macro Cell operation, containing the STN MAC addresses of client devices to which it responds. When a frame from a client with an STN MAC address contained in the ACK table is received, an ACK is transmitted to that client, and the frame is forwarded to the controller. Entries are added to the ACK table based on message traffic transmitted, or by control messages from the controller. Certain incoming messages, which may include broadcasts and/or probe request frames, are forwarded to the controller, again using WMAT, translating the over-the-air Macro Cell BSSID to the BSSID used for the controller connection.

Figure 1:
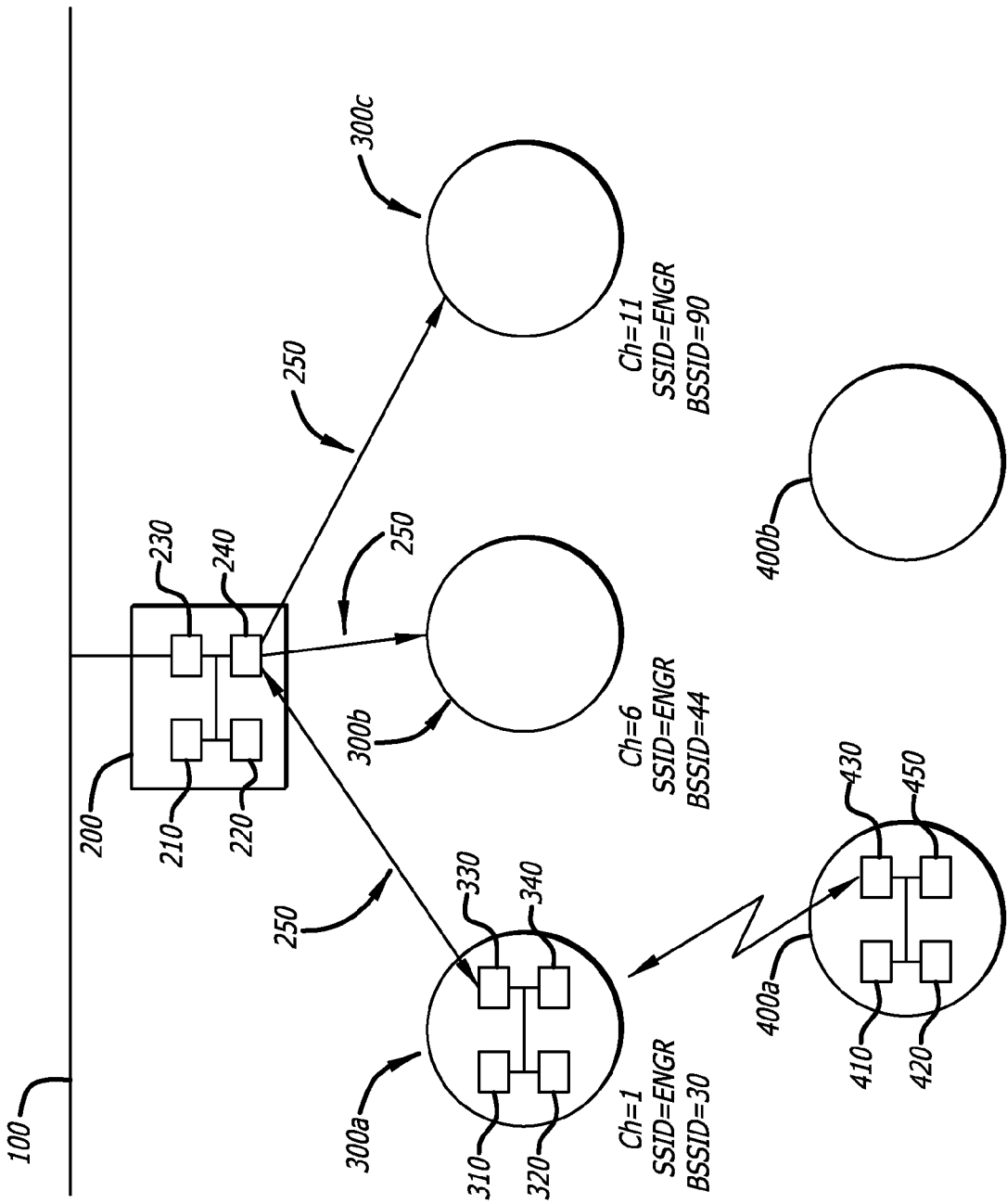
FIG. 1 shows a Micro Cell network.

As shown in FIG. 1, a Micro Cell architecture network supports connections of wireless clients 400a, 400b to a wired network. Wired network 100, such as a wired IEEE 802.3 Ethernet network, is connected to controller 200. Controller 200 supports connections 250 to access nodes 300a, 300b, 300c. Access nodes 300a, 300b, 300c provide wireless communications to wireless clients 400a, 400b.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art wireless access nodes 300a, 300b and 300c are also purpose-built digital devices. These access nodes include CPUs 310, memory hierarchy 320, and wireless interfaces 330. Wireless interfaces 330 may contain one or more radio transmitter/receiver pairs. As with controller 200, the CPU commonly used for such access nodes is a MIPS-class CPU such as one from Raza Microelectronics or Cavium Networks, although processors from other vendors such as Acorn, Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interfaces 330 are typically interfaces operating to the family of IEEE 802.11 standards including but not limited to 802.11a, b, g, and/or n.

Wireless client 400 is also a digital device, similarly having CPU 410, memory hierarchy 420, wireless interface 430, and I/O devices 450. As examples, wireless device 400 may be a general purpose computer such as a laptop, or may be a purpose-built device such as a Wi-Fi phone or a handheld scanner. In a general-purpose computer, CPU 410 may be a processor from companies such as Intel, AMD, Freescale, or the like. In the case of purpose-built devices, Acorn or MIPS class processors may be preferred Memory hierarchy 420 comprises the similar set of read-only memory for device startup and initialization, fast read-write memory for device operation and holding programs and data during execution, and permanent bulk file storage using devices such as flash, compact flash, and/or hard disks. Additional I/O devices 450 may be present, such as keyboards, displays, speakers, barcode scanners, and the like.

In operation of the Micro Cell network according to FIG. 1, access nodes 300 start up, and establish a connection 250 with controller 200. Access nodes 300 may boot from images stored internally in memory hierarchy 320, by fetching an image from controller 200, or by a combination. The connection 250 established, for example, between access node 300*a* and controller 200 is established using standard TCP/IP, and is established with an ID, for example, the same value as the BSSID used for wireless transmissions, in this case, 31. As access node 300*a* continues its startup, it advertises wireless services on channel 1 using BSSID=30 and SSID="ENGR" as an example. Similarly, access nodes 300*b* and 300*c* start up, establishing communications links 250 with controller 200, and advertising wireless services as shown, each advertising the SSID "ENGR" but with different BSSIDs and on different channels.

While connection 250 is shown as a direct link between controller 200 and access nodes 300, this link may be a wired link such as an 802.3 Ethernet link, or a wireless link such as an 802.11 mesh network link, WiMax link, or other wireless backhaul. Wired links may be electrical, optical, or a combination, including passing through switched networks, for example, having an access node 300 at a remote location such as a user's home, connecting back to corporate controller 200 through public Internet connections. It should be noted that these connections 250 may be encrypted, for example using GRE tunnels. Traffic across this link 250, from access node 300 to controller 200 is identified, for example using the BSSID of the radio in access node 300.

Figure 2:
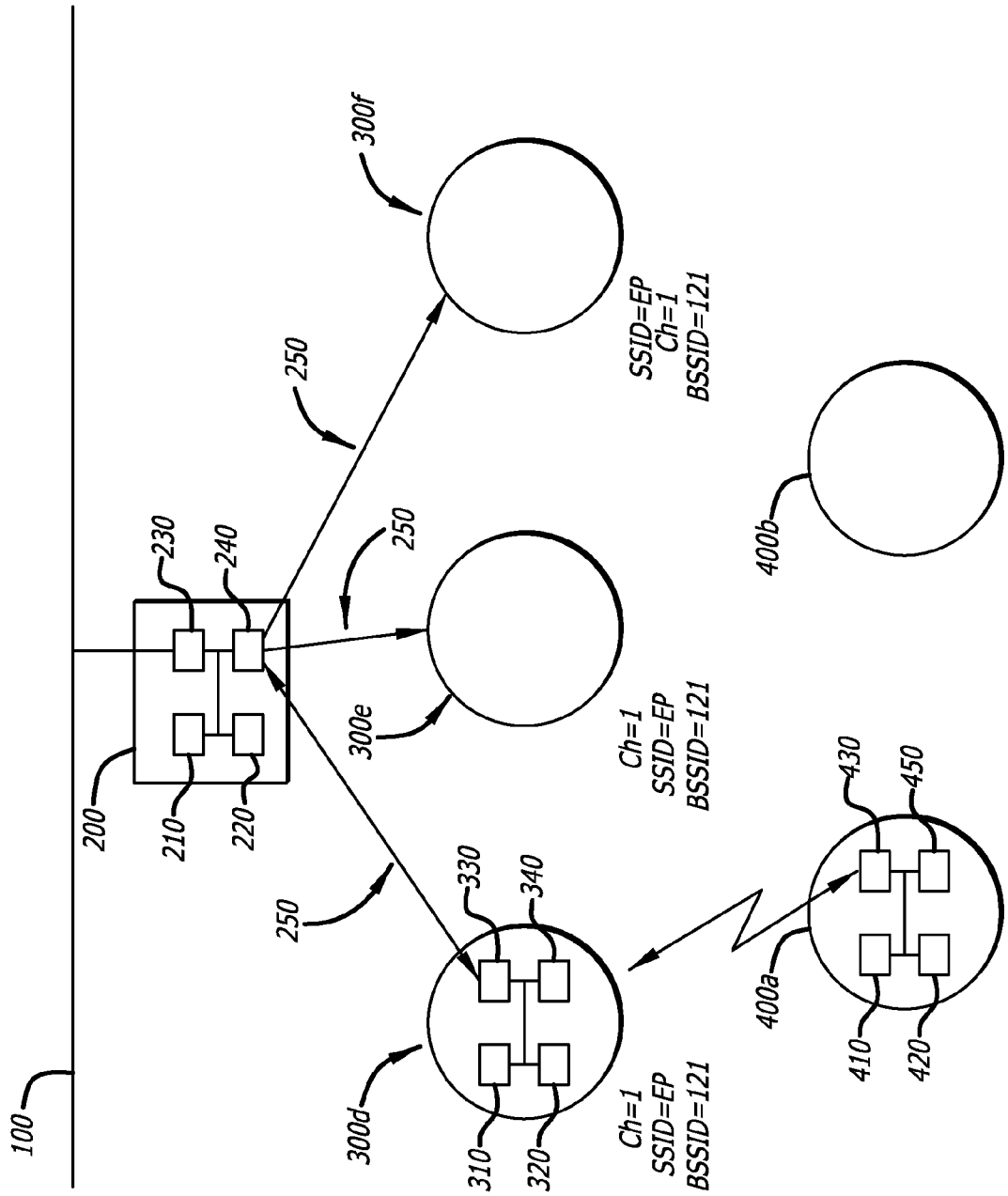
FIG. 2 shows a Macro Cell network.

While the internal architecture of controller 200, access nodes 300, and wireless client 400*a* in the Macro Cell network of FIG. 2 may be similar to their counterparts in FIG. 1, the operation of the wireless network is different. In the Macro Cell network, as shown in FIG. 2, multiple access nodes operate on the same channel, advertising the same BSSID, and therefore SSID, as an example, all operating on channel 1 with SSID="EP" and BSSID=121.

Figure 3:
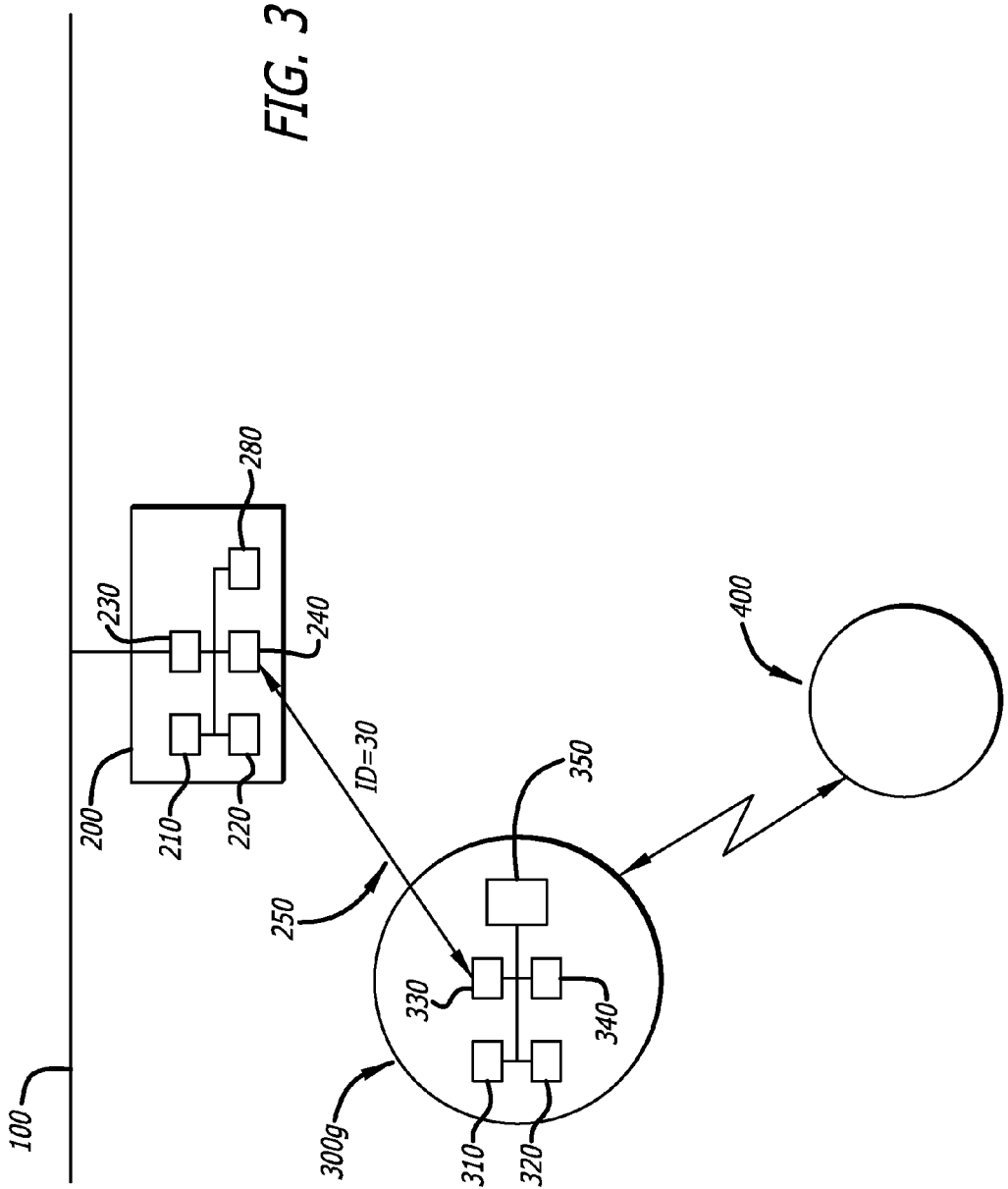
FIG. 3 shows details of a network.

According to an aspect of the present invention, one or more access nodes in a Micro Cell network during startup are converted to Macro Cell operation As shown in FIG. 3, as access node 300*g* starts up, it establishes a connection with controller 200, identifying itself using a preset ID, for example its BSSID (BSSID1). This ID is recognized by the Macro Cell Manager process 280 running in controller 200. Macro Call Manager 280 instructs access node 300*g* to switch to Macro Cell mode, supplying it with a new BSSID (BSSID2) to use for over-the-air communications. Other information, such as channel number and SSID may also be supplied. In transmit operation, packets sent by controller 200 to access node 300*g* using BSSID1 are translated using wireless mac address translation (WMAT) and transited over the air using the translated BSSID, BSSID2.

For receive operation, according to the present invention, a subset of frame types received by a Macro Cell access node such as access node 300*g* are forwarded directly to controller 200. This subset may include messages such as broadcasts and/or probe request frames, or other types as defined by Macro Cell manager 280 and/or controller 200. Frames sent from Macro Cell access node 300*g* to controller 200 undergo WMAT, substituting BSSID1 for BSSID2.

Other received frames are processed in Macro Cell access node 300*g* according to an ACK table 350 kept by access node 300*g*. Each frame received contains the STN MAC address of the device sending the frame, as well as BSSID2, the BSSID of the device to which the frame is addressed. ACK table 350 contains the STN MAC addresses of client devices to which access node 300*g* responds. When access node 300*g* receives a frame with an STN MAC address with a match in its ACK table, it transmits an ACK to that wireless client, and forwards the frame to controller 200. Entries to ACK table 350 may be added and/or deleted using control messages sent by controller 200 and/or Macro Cell manager 280. Entries may also be added to ACK table 350 automatically by Macro Cell access node 300*g*, by inspecting STN MAC addresses of messages received from controller 200 to be transmitted after WMAC using the over the air BSSID2, and adding those SDN MAC addresses not already present in ACK table 350.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method of overlaying a Macro Cell wireless network on a Micro Cell wireless network comprising a controller, a macro cell manager process, and at least one access node having at least one radio comprising:

initializing the access node in Micro Cell mode, establishing a communications link between a radio in the access node and the controller using a first identifier, recognizing the identifier of the access node by the macro cell manager, sending commands to the recognized access node by the macro cell manager to switch the recognized access node to macro cell mode and supplying the recognized access node with an over the air Basic Service Set Identifier (BSSID), and switching the access node to macro cell mode in response to the commands, and initializing wireless macro address translation to translate messages sent to the access node using the first identifier to the over the air BSSID, and translating messages received by the access node from the over the air BSSID to the first identifier.

2. The method of claim 1 further comprising:

initializing an ACK table in the access node as part of macro cell mode, wherein the access node in macro cell mode automatically responds to client stations with matching entries in the ACK table.

3. The method of claim 2 where the ACK table is managed by commands from the macro cell manager adding or deleting client station entries.

4. The method of claim 2 where entries to the ACK table are added by the access node based on traffic transmitted through the access node.

5. The method of claim 2 where certain frame types received by the access node are recognized, subject to wireless macro address translation, and sent to the controller.

6. The method of claim 5 where the frame types recognized by the access node includes broadcast frames.

7. The method of claim 5 where the frame types recognized by the access node include probe request frames.

8. The method of claim 5 where the frame types recognized by the access node are controlled by the macro cell manager.

9. The method of claim 2 where frames from clients with matching ACK table entries are recognized, subject to wireless macro address translation, and sent to the controller.

* * * * *